Sept. 26, 1933.   H. L. HALBACH ET AL   1,928,016
APPARATUS FOR AUTOMATICALLY SUPPLYING BATCH TO GLASS TANKS
Filed Dec. 6, 1930   2 Sheets-Sheet 2

INVENTORS
H. L. Halbach
and
Don R. Limbers
by J. C. Bradey

Patented Sept. 26, 1933

1,928,016

UNITED STATES PATENT OFFICE 1,928,016

APPARATUS FOR AUTOMATICALLY SUPPLYING BATCH TO GLASS TANKS

Howard L. Halbach and Don Raymon Limbers, Clarksburg, W. Va., assignors to Pittsburgh Plate Glass Company, a corporation of Pennsylvania Application December 6, 1930. Serial No. 500,575

3 Claims. (Cl. 49—14)

Figure 1:
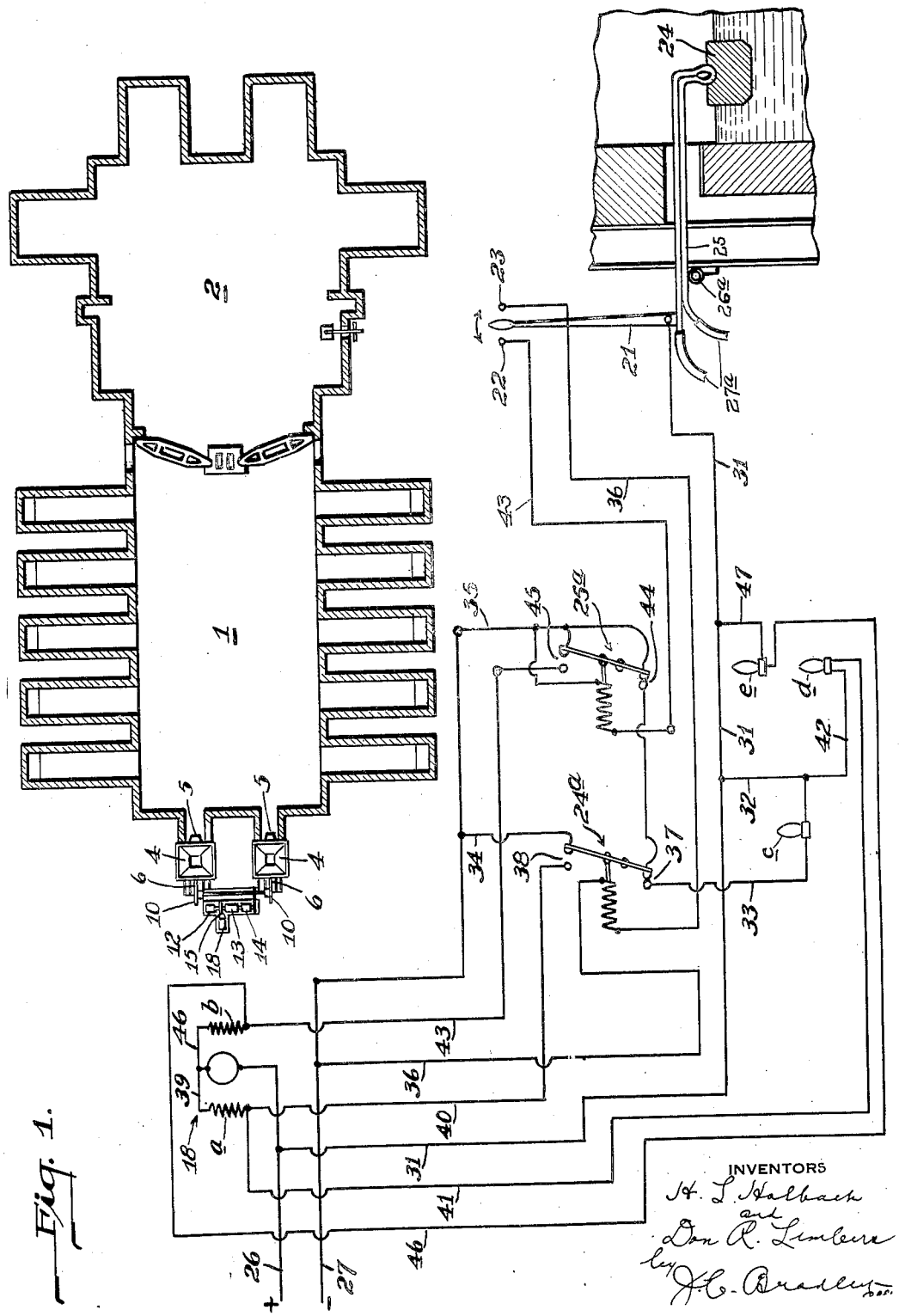
Figure 2:
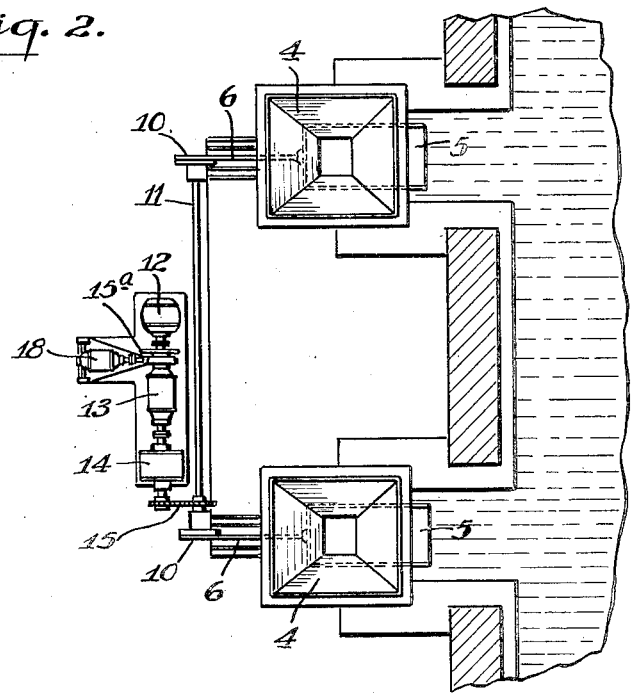
Figure 3:
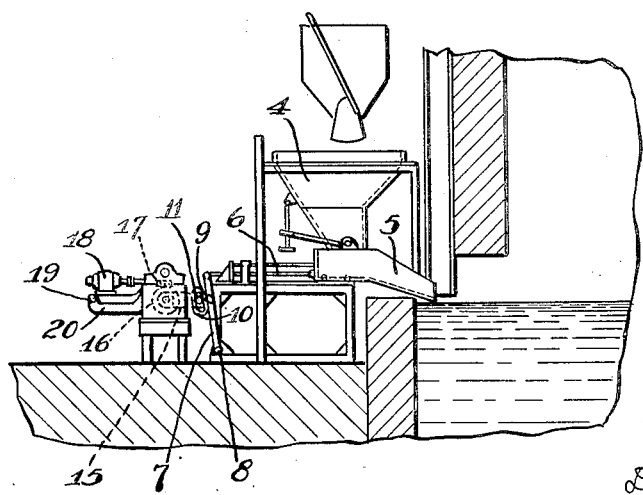

The invention relates to apparatus for controlling the supply of batch to glass tanks. The invention is shown as applied to a tank for making window glass and has a particular utility here, as later explained, but the invention is not limited to use in this particular field. In tanks from which glass is drawn in a continuous sheet, it is important that the level of the glass in the tank be kept constant within relatively narrow limits since certain parts which control the formation of the sheet must bear a definite established relation to the glass level and operate to the best advantage when this condition is maintained. Temperature conditions which affect the formation of the sheet are also more easily maintained constant when the glass level is held at the same point. The present invention is designed to regulate the feed of batch to the tank by the level of the glass, the batch feeder automatically ceasing operation when the level rises above a predetermined point and starting when the level drops below such point. This automatic control relieves the workmen of the work incident to constantly watching the glass level and the operation of the feeder, and controls the level of the glass with more certainty and within closer limits than can be done when the duty is left to an operator who starts and stops the feeder in accordance with his observation of the glass level. Briefly stated, the desired control is secured by a float in the glass which operates a switch which controls the prime mover which feeds the batch. One embodiment of the invention is illustrated in the accompanying drawings, wherein:

Figure 1 is a diagrammatic view partially in section and partially in plan showing the complete arrangement as applied to a tank. And Figs. 2 and 3 are enlarged detail views of the feeder apparatus at the rear end of the tank, Fig. 2 being a plan view partially in section, and Fig. 3 being a side elevation partially in section.

Referring to the drawings, 1 is a melting tank heated by the usual regenerative means, and 2 is a drawing kiln from which glass is drawn in sheets from the bays 3 by suitable drawing machines (not shown). Batch is supplied to the rear end of the tank from the hoppers 4, 4. Below the ends of the hoppers are the chutes 5, 5 with their ends leading into the tank as shown in Fig. 3 and mounted for reciprocation. Fixed scrapers fitting in the chutes induce a forward feed when the chutes are reciprocated. Secured to the chutes 5, 5 are the rods 6, 6 suitably guided for right line movement. The rods are pivoted at their rear ends to the rocker arms 7 which in turn are pivoted at their lower ends to the brackets 8. The rocker arms carry rollers 9 engaged by cams 10 carried by the transverse shaft 11. The shaft 11 is rotated by the electric motor 12 through the intermediary of the variable speed reducer 13, the speed reducer 14 and a chain 15 passing around a drive sprocket on the drive shaft of the reducer 14 and a driven sprocket on the shaft 11. The variable speed reducer 13 is provided at one end with a wheel $15^a$ for regulating the speed transmitted by the reducer and thus governing the speed of rotation of the shaft 11 and the feed of batch by the rods 6. When this wheel is turned in one direction, the speed is increased and when turned in the other direction, the speed is decreased. The device 13 which is preferably used, is the well-known J. F. S. reducer employing planetary gearing and a cone drive. In this construction, a swivelled screw connected to the wheel $15^a$ shifts the points of driving contact between the cones and thus gives the desired variations of speed.

The batch feeding apparatus as above described, including the speed reducer with its wheel control, is well known in the art, and no claim is made to this structure, the applicant's invention consisting in the means for automatically controlling the feed apparatus from the level of the glass in the tank. This is preferably accomplished by the use of a split field control motor connected to the control wheel $15^a$ of the variable speed reducer, the operation of which motor is governed by a switch controlled by a float in the glass. When the glass level lies at the desired point, no current is supplied to the motor. When the level of the glass drops below the desired point, the control motor is run in one direction, and when the level of the glass rises above the desired point, the motor is run in the reverse direction.

Secured to the side of the wheel $15^a$ is a worm wheel 16 (Fig. 3) driven by a worm 17, which engages the upper side of the worm wheel. The worm is driven from the control or pilot motor 18 pivoted at 19 upon a supporting bracket 20. The worm may be disengaged from the worm wheel by swinging the motor and the worm in a counter clockwise direction (Fig. 3) about the pivot 19. This leaves the wheel $15^a$ free to be operated by hand if so desired. The motor has the split field sections $a$ and $b$, and the flow of current through these sections, and the consequent direction of rotation, is controlled by means of the switch arm 21 which is moved back and forth between its controls 22 and 23 by the float 24.

The switch arm is operated by the lever 25 bearing at its inner end in a recess in the top of the float and fulcrumed on the bracket 26ᵃ secured to the outer face of the furnace wall. The lever is formed of a pipe having connection at its ends to the flexible water supply connections 27ᵃ so that the pipe may be kept from overheating by circulating water therethrough. When the level of the glass is at the proper point and the feed of batch is just enough to compensate for the glass withdrawn from the tank, the switch arm occupies the neutral position shown and the control motor 18 does not operate to turn the wheel 15 either in one direction or the other. When the level of the glass drops below the desired point, the arm 21 swings to the right and engages the contact 23, the control arrangement being such that the motor 18 is now operated to turn the wheel 15 and increase the speed transmitted by 13. When the level of the glass rises above the desired point, the arm 21 swings to the left and engages the contact 22, the control arrangement at this time causing the motor 18 to operate in the reverse direction turning the wheel 15 so that the speed transmitted by 13 is decreased.

The control apparatus includes the relays 24ᵃ and 25ᵃ and connections as shown in Fig. 1, such figure also showing the indicating lamps, c, d, and e, although they form no part of the automatic control. When the parts are in the position shown, no current flows through either field section a or b of the motor, since the circuit from the positive lead 26 to the negative lead 27 is interrupted at the contacts 37 and 38, and 44 and 45 of the relays 24ᵃ and 25ᵃ, the switch arms of the relays being spring held in the positions shown when the coils of the relays are not energized. No current flows through either relay coil until the switch arm contacts with either 22 or 23. At this time the white lamp c is lighted, by current through the wires 31, 32, and 33, the arms of both relays and the wires 34 and 35.

If the level of the glass in the tank now drops below its proper level, the arm 21 moves to the right and contacts with 23. This gives a flow of current through the coil of the relay 24ᵃ via wire 31, arm 21, and wire 36. The arm of the relay 24ᵃ is now moved breaking contact at 37 and making contact at 38. The breaking of contact at 37 interrupts the current through the white lamps c. The making of contact at 38 permits current to flow through the coil a of motor 18 via lead 26, wire 39, wire 40, contacts at 38, wire 34, and negative lead 27, thus causing the motor 18 to operate to turn the wheel 15 to increase the speed transmitted by the reducer 13. At the same time current flows through the red lamp d via the wire 41, wire 42, wire 32, wire 31, arm 21, contact 23, and wire 36.

If the level of the glass in the tank rises above its proper level, the arm 21 moves to the left and contacts with 22. This gives a flow of current through the coil of the relay 24ᵃ, via wire 31, arm 21, and wire 43. The arm of the relay is now moved, breaking contact at 44 and making contact at 45. The making of contact at 45 permits current to flow through the coil b of motor 18, via lead 26, wire 46, wire 43, contacts at 45, wire 35, and negative lead 27, thus causing the motor 18 to operate reversely to turn the wheel 15 to decrease the speed transmitted by the reducer 13. At the same time, current flows through the green lamp e via the wire 46, wire 47, wire 31, arm 21, contact 22, and wire 43.

What we claim is:

1. In combination with a glass tank, a batch feeder therefor driven by a motor through a variable speed reducer, an electric pilot motor for regulating the speed of said reducer, a switch controlling the operation of said pilot motor, and a float in the molten glass in the tank controlling the position of said switch.

2. In combination with a glass tank, a batch feeder therefor driven by a motor through a variable speed reducer, having a control member which moves in one direction to increase the speed transmitted by the reducer, and in the other direction to decrease such speed, a split field electric motor for moving said member in both directions, a switch and cooperating means for controlling the flow of current through the split field of the motor in order to govern its direction of rotation, and a float in the molten glass in the tank controlling the position of said switch.

3. In combination with a glass tank, a batch feeder therefor driven by a motor through a variable speed reducer having a control member which moves in one direction to increase the speed transmitted by the reducer, and in the other direction to decrease such speed, a split field electric motor for moving said member in both directions, a switch and cooperating means for controlling the flow of current through the split field of the motor in order to govern its direction of rotation, and a float in the molten glass in the tank controlling the position of said switch, said cooperating means including a pair of relays operated by the movement of said switch.

HOWARD L. HALBACH.
DON RAYMON LIMBERS.